United States Patent [19]

Hass

[11] 3,867,508

[45] Feb. 18, 1975

[54] EXHAUST GAS CONVERSION PROCESS AND APPARATUS

[75] Inventor: Robert H. Hass, Fullerton, Calif.

[73] Assignee: Union Oil Company of California, Los Angeles, Calif.

[22] Filed: Apr. 16, 1973

[21] Appl. No.: 351,808

Related U.S. Application Data

[63] Continuation-in-part of Ser. No. 193,851, Oct. 29, 1971, abandoned.

[52] U.S. Cl................. 423/213.7, 60/296, 60/301
[51] Int. Cl............................ B01j 9/04, B01d 53/00
[58] Field of Search............. 423/212, 213.2, 213.7; 60/296, 307; 252/416

[56] References Cited
UNITED STATES PATENTS

| | | | |
|---|---|---|---|
| 3,072,457 | 1/1963 | Bloch | 423/213.7 X |
| 3,149,926 | 9/1964 | Johnson | 423/212 X |
| 3,228,746 | 1/1966 | Howk et al. | 423/213.5 X |
| 3,656,915 | 4/1972 | Tourtellotte | 423/213.7 |
| 3,701,823 | 10/1972 | Hardison | 423/213.7 |

*Primary Examiner*—G. O. Peters
*Attorney, Agent, or Firm*—Lannas S. Henderson; Richard C. Hartman; Dean Sandford

[57] ABSTRACT

A process is disclosed for the catalytic conversion of nitrogen oxides, unburned hydrocarbons and carbon monoxide in exhaust gases, utilizing a two-zone conversion system with auxiliary air being injected between the two zones. The basic novel feature of the process involves alternately reversing the direction of gas flow through the two zones so that each zone functions alternately under reducing conditions for the conversion of nitrogen oxides, and under oxidizing conditions for the conversion of carbon monoxide and hydrocarbons.

6 Claims, 4 Drawing Figures

EXHAUST GAS CONVERSION PROCESS AND APPARATUS

RELATED APPLICATIONS

This application is a continuation-in-part of Ser. No. 193,851 filed Oct. 29, 1971, now abandoned.

BACKGROUND AND SUMMARY OF INVENTION

Much effort has been devoted in recent years to the development of thermal and catalytic converters for removing air pollutants such as hydrocarbons, carbon monoxide and nitrogen oxides ($NO_x$) from engine exhaust gases. In the catalytic field, the general approach has been to oxidize the unburned hydrocarbons and carbon monoxide with added air, and to use the carbon monoxide in the exhaust gases as a reducing agent to convert the nitrogen oxides to nitrogen as follows:

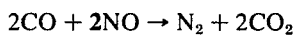

$$2CO + 2NO \rightarrow N_2 + 2CO_2$$

Considerable success has been achieved in the catalytic oxidation of unburned hydrocarbons and carbon monoxide, but the conversion of the nitrogen oxides has proven to be a much more difficult problem. Two-stage conversion systems have been proposed (as illustrated for example in U.S. Pat. No. 3,544,264), involving an initial contacting zone in which the raw exhaust gases are passed under reducing conditions over a suitable catalyst in the absence of added air, followed by a second zone in which oxidation is effected after adding to the first stage off-gases at least a stoichiometric proportion of air. The principal problem with these systems is that the catalyst utilized in the first stage becomes gradually deactivated under the conditions previously utilized. The consistent failure of the first-stage conversion zone has led to such drastic proposals as recycling a portion of the exhaust gases to the engine combustion zone to reduce temperatures therein and thereby reduce the production of nitrogen oxides. This of course significantly reduces engine performance.

I have now discovered a simple technique by which all three of the above noted contaminants can be effectively and continuously converted in a two-stage contacting system, thereby eliminating the need for recycling of exhaust gas. Briefly stated this technique consists in periodically reversing the direction of gas flow through the two contacting zones. Since air is continuously injected between the two zones, it will be seen that by operating in this manner each catalyst bed functions alternately under reducing conditions for converting nitrogen oxides, and under oxidizing conditions for converting carbon monoxide and hydrocarbons. "Net reducing" conditions (in which the $O_2/CO$ mole ratio is less than stoichiometric, or ½) normally prevail in the catalyst bed which first contacts the raw exhaust gas, while net oxidizing conditions prevail in the downstream catalyst bed wherein the $O_2/CO$ mole ratio is greater than stoichiometric. (It should be noted that when $O_2/CO$ ratios are referred to herein, the oxygen required to provide such ratio is actually the excess over a small additional proportion required to oxidize other oxidizable components in the exhaust gas, principally unburned hydrocarbons and hydrogen).

The catalysts employed herein comprise as their essential active ingredient a multivalent metal oxide, the term "multivalent" being used to designate metals having more than one positive valence state. Further, at exhaust gas temperatures these metal oxides are rather easily reduced by carbon monoxide to the metallic state, and under the net oxidizing conditions described above are rather easily oxidized to their highest valence state. With this background in mind, a theoretical explanation will be proposed for the failure of conventional, unidirectional-flow two-stage conversion systems, and the success of the herein described alternating flow direction system. It is not intended however that the invention should be limited to this theoretical explanation.

In the conventional two-stage contacting systems, both of the fresh catalyst beds are initially in their highest state of oxidation. The second bed remains in that condition because of the net oxidizing conditions prevailing therein. But due to the net reducing conditions prevailing in the first catalyst bed, there is apparently a gradual conversion of the catalyst, first to a lower valent metal oxide, and finally to the free metal form. This conversion may actually take place in waves, with a band of lower valent metal oxide moving gradually downstreamwardly through the catalyst bed, depleting the higher valent metal oxide zone near the effluent end of the bed, and being "chased" by an increasing zone of free metal form from the influent end of the bed. Several hours are normally required to completely convert the first catalyst bed to the free metal form, and it is during this time that the first catalyst bed appears to be active for $NO_x$ conversion, but thereafter becomes $NO_x$-inactive. It would therefore appear that the lower valent metal oxide species must be the active form of the catalyst for $NO_x$ conversion, the metallic form being inactive. It has been observed experimentally that copper chromite catalysts which have been deactivated for $NO_x$ conversion can be regenerated by oxidation. This type of regeneration is in effect what is accomplished by the procedure described herein. Before the first catalyst bed has been completely reduced to the $NO_x$-inactive form, the direction of flow of exhaust gas is reversed, and by virtue of the air injected between the two contacting zones, the former reducing zone becomes an oxidation zone and in effect a catalyst regeneration zone.

From the foregoing discussion, the failure to maintain $NO_x$ conversion in the conventional two-stage systems can be readily understood. In the first stage, to which no air is added, the raw exhaust gases are rich in CO and lean in oxygen; the $O_2/CO$ mole ratio is seldom if ever above ¼, and this ratio rapidly declines along the length of the catalyst bed as the oxygen is consumed. Under these conditions, the catalyst is gradually reduced to the inactive free metal form. In the second stage, a greater than stoichiometric proportion of air is mixed with the gases at the inlet thereto. Under these net oxidizing conditions the catalyst is maintained continuously in its highest valent oxide form, which is active for the oxidation of CO and hydrocarbons but inactive for $NO_x$ conversion. Thus, in neither zone is it possible to maintain continuously a segment of the desired $NO_x$-active, lower-valent metal oxide form of the catalyst.

DETAILED DESCRIPTION

A. Description of Drawings

Referring now to the drawings.

Figure 1:
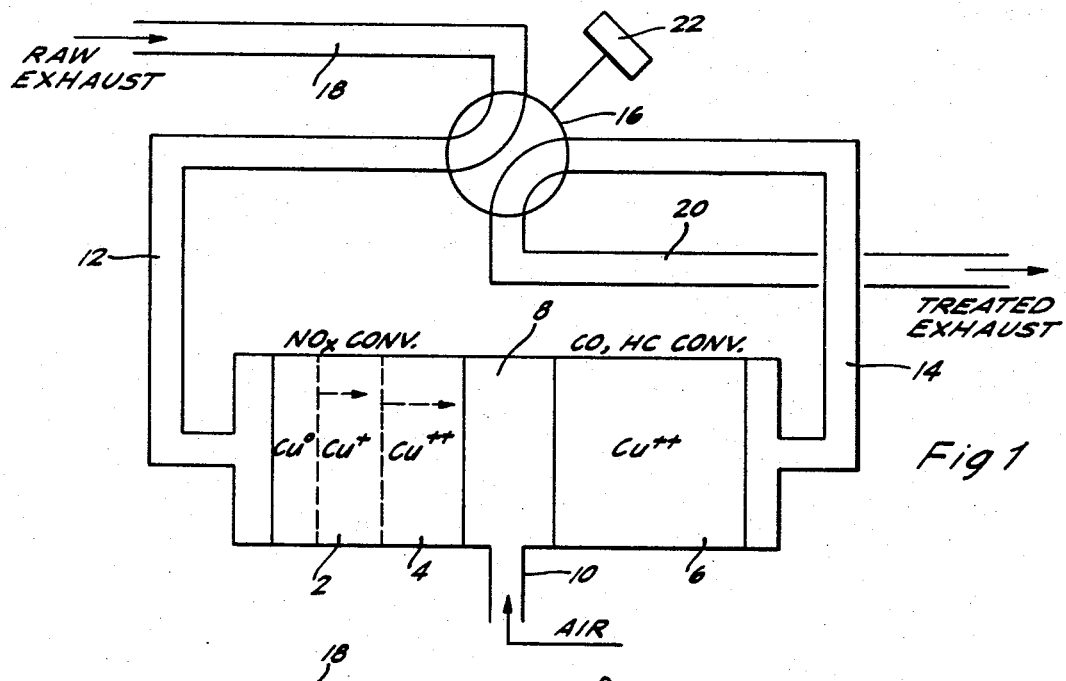
FIGS. 1 and 2 are schematic illustrations of a suitable apparatus for practicing the invention, the flow of exhaust gas through the converter being to the right in FIG. 1 and to the left in FIG. 2.
Figure 2:
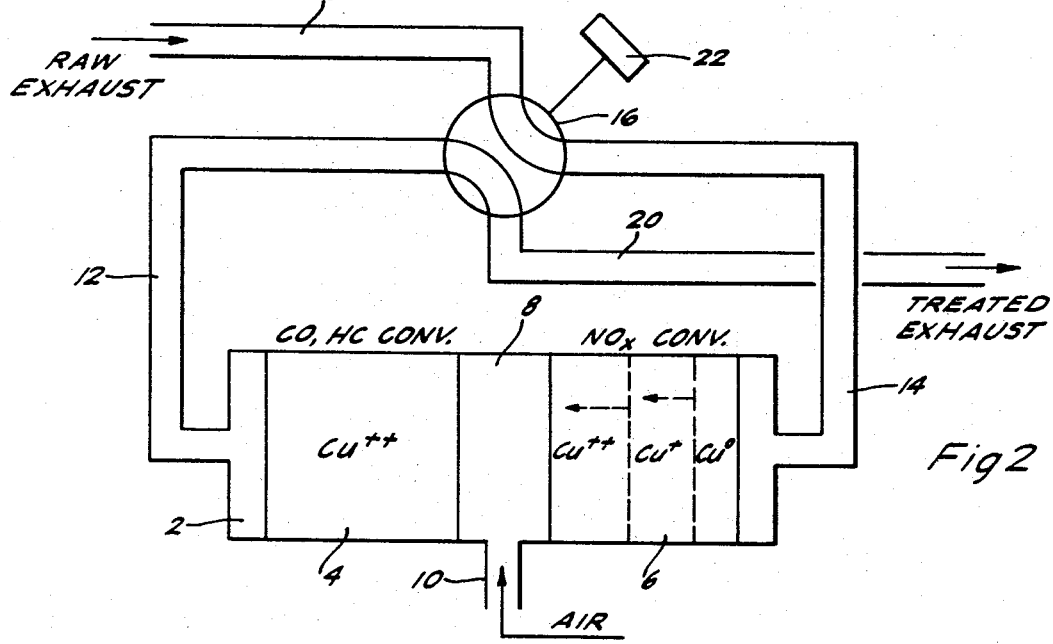

Referring now more particularly to FIGS. 1 and 2, the principal piece of apparatus consists of a metallic catalyst housing 2, containing two beds of catalyst 4 and 6, separated by an interspace 8 into which air is injected via conduit 10. Any desired means of air injection may be utilized, but ordinarily a pump is used which is geared to engine speed so as to provide the proper ratio of air to exhaust gas. Exhaust gas conduits 12 and 14 lead from opposite ends of the converter to a four-way, two-position valve 16 which operates to couple conduits 12 and 14 alternately to exhaust gas inlet conduit 18 and exhaust gas outlet conduit 20. The valve operator 22 is connected to the ignition switch, emergency brake, parking shift lever, or some other suitable signaling device to cause the position of the four-way valve to change with each trip of the automobile. Usually at least about 10 to 20 hours is required to deactivate the reducing bed for $NO_x$ conversion, and since continuous engine operation for such periods of time is very rare, one change of valve position per engine startup or shutoff is normally ample.

In FIG. 1, it will be seen that, with exhaust gases flowing to the right through the converter, catalyst bed 4 functions for $NO_x$ conversion and bed 6 for carbon monoxide and hydrocarbon conversion. For illustrative purposes, the possible chemical state of a copper-containing catalyst after a few hours of engine operation in this manner is depicted. In bed 4, a zone of free metal catalyst is found near the inlet line 12, and downstreamwardly is found a zone comprising mainly cuprous copper, and still further downstreamwardly the unreduced cupric state is found. It will be understood that the demarcation line between these three zones is probably not sharp as illustrated, but qualitatively such a bed wound be gradually deactivated from left to right by progressive conversion to the free metal form.

In FIG. 2, with the exhaust gas flow being to the left, after a few hours of engine operation bed 6 is being deactivated in the same manner as bed 4 in FIG. 1, while bed 4 has been regenerated to the cupric state, and is thus in condition for $NO_x$ conversion upon the next reversal of exhaust gas flow direction.

Figure 3:
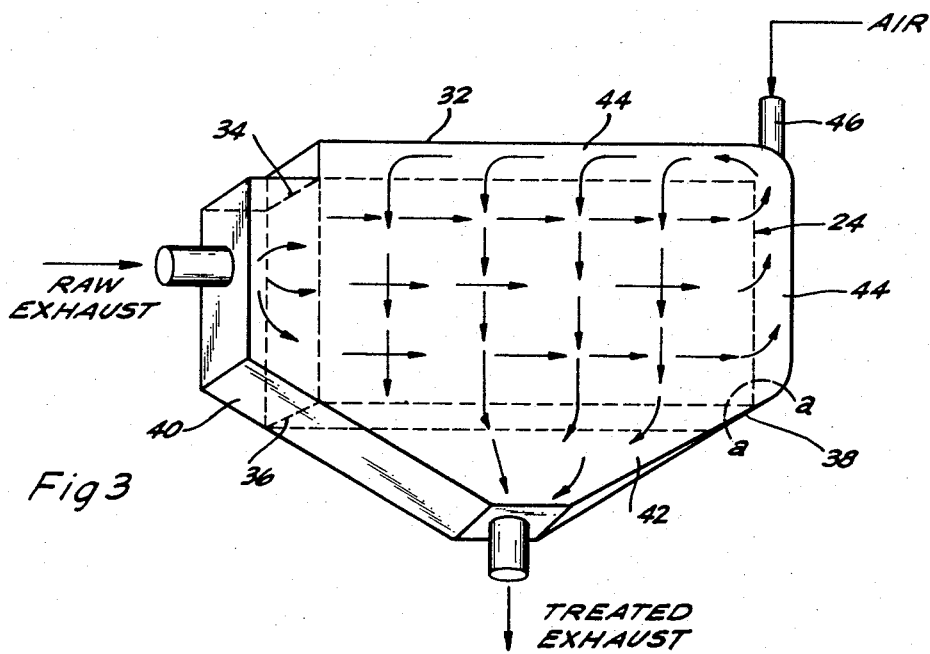
FIG. 3 is a perspective drawing of a preferred type of converter for use in the process, utilizing a monolithic type of catalyst to be described more in detail hereinafter.
Figure 4:
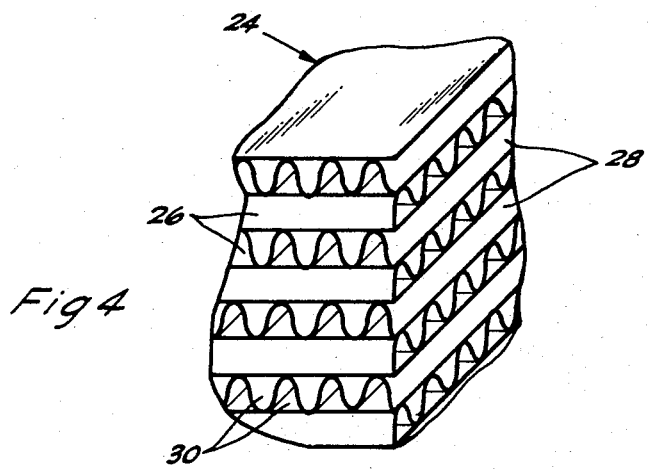
FIG. 4 is a perspective view of one corner of the monolithic catalyst block cut off by line a—a of FIG. 3.

One of the problems encountered in two-stage exhaust gas conversion systems is that on cold engine startup, considerable time is required for the $NO_x$ conversion zone to reach operative conversion temperatures. Since the second, or oxidation, stage is exothermic, various means have been suggested for arranging the two conversion zones in heat exchange relationship with each other so as to improve conversion efficiency in the $NO_x$ conversion zone. FIGS. 3 and 4 illustrate a highly efficient and novel heat exchange converter which can be advantageously utilized in the conversion systems depicted in FIGS. 1 and 2.

Referring more particularly to FIG. 3, the principal element of the converter consists of a monolithic, rectangular porous ceramic block 24 which is impregnated with any of the catalytic metals hereinafter described, and which is capable of transmitting gases horizontally from one face to the opposite face and also perpendicularly from one of the inclined faces to the other included face. The manner in which this is achieved will be more apparent from the block structure depicted in FIG. 4. The basic structure of the block consists of layers 26 of a porous corrugated ceramic material such as alpha alumina, bonded to intervening sheets 28 of the same material, thus defining rows of parallel channels 30 running from one face of the block to the opposite face. Each alternating layer 26 is positioned with the corrugations running in opposite directions, so that channels 30 in alternating layers are perpendicular to each other. It will thus be seen that gases can traverse the block horizontally from any one face to the opposite face, and there will be essentially no intermingling of two gas streams flowing perpendicularly to each other through the block. Blocks such as these are manufactured for heat exchange purposes by the Minnesota Mining and Manufacturing Company and also Corning Glass. For purposes of the present invention the block may be impregnated with the desired catalytic metal oxides and then calcined, or the desired metal oxides may be admixed with the wet ceramic base used to manufacture the block.

Referring back to FIG. 3, catalyst block 24 is enclosed within an outer metallic housing 32 in such manner as to provide a substantially gas tight seal between the housing walls and edges 34, 36 and 38 of the catalyst block, thereby defining a gas inlet manifold 40, a gas outlet manifold 42, and an L-shaped gas transfer manifold 44 surrounding two adjacent faces of the catalyst block. An air inlet conduit 46 opens into gas transfer manifold 44 near the unsealed corner of the catalyst block.

It will be seen that gases entering inlet manifold 40 will pass into the left hand face of catalyst block 24 and emerge from the right hand face into gas transfer manifold 44. This constitutes the reduction stage for $NO_x$ conversion. The resulting gases then flow upwardly and mingle with air from air inlet 46, and then flow downwardly through the top face of the catalyst block to begin the oxidation stage, finally emerging into outlet manifold 42. Obviously, the direction of gas flow can be reversed in the apparatus of FIG. 3 in the same manner as disclosed in connection with FIGS. 1 and 2.

B. Catalysts

Operative catalysts for use herein comprise any one or more of the multivalent transitional metal oxides which are relatively easily reduced from a polyvalent metal oxide to a lower valent oxide. The term "multivalent" is used to designate metals having more than one positive valence. This includes primarily the metals of Groups IB, VB, VIB, VIIB and VIII of the Periodic Table. The preferred metals are copper, chormium, silver, vanadium, manganese, iron, cobalt, nickel, platinum and palladium, any of which may be used singly or in any desired combination. The active component or components may be composited with, or supported upon, a suitable refractory inorganic oxide such as alumina, silica-alumina, silica-zirconia, alumina-silica-mangesia, or the like. As to form or shape, the catalyst may be supplied as spheres, extrudates, cylinders, or pellets arranged in the form of a confined bed or beds, but the preferred form is a porous monolithic block as previously described. The preferred catalysts consist of copper or copper chromite supported on a porous ceramic block, or on alumina pellets of about ⅛-inch diameter. Supported catalysts normally comprise about 0.5 to 60 weight-percent of the active metal oxide or oxides.

Many of the foregoing catalysts are rapidly deactivated for $NO_x$ conversion by lead-containing exhaust gases. It is therefore preferred to operate under essentially lead-free conditions. Exhaust gases are regarded as being essentially lead-free when they are derived from the combustion of gasolines containing no more than "contaminant" levels of lead, i.e., less than about 0.05 g. per gallon, preferably less than about 0.01 g/gallon.

C. Example

The following illustrates a suitable specific modification of the process:

A two-zone converter similar to that illustrated in FIGS. 1 and 2 is packed with two 5-pound beds of a copper chromite-alumina catalyst containing 14.5 percent CuO and 14 percent $Cr_2O_3$. A lead-free engine exhaust gas containing 2.0 volume-percent carbon monoxide, 0.25 percent hydrocarbons, 0.125 percent nitric oxide, 13 percent carbon dioxide, 0.67 percent hydrogen, 10 percent water vapor, 0.5 percent oxygen and 73 percent nitrogen is passed through the converter at a GHSV of 15,000 volumes per volume of catalyst per hour at an inlet temperature of 850°F. Air is injected between the two catalyst beds in an overall amount sufficient to provide 1.5 moles of $O_2$ for each mole of CO in the initial exhaust gas. The initial conversion of nitric oxide, hydrocarbons and carbon monoxide is over 90 percent, but after a few hours the nitric oxide conversion begins to drop off, and after 24 hours there is substantially no conversion of nitric oxide. Upon reversing the flow of gas through the two catalyst beds while maintaining the same conditions therein, nitric oxide conversion rapidly builds up to over 90 percent, and by reversing the flow direction every 6 hours this high level of conversion is continuously maintained for periods of 6 months or more.

While the foregoing has dealt with specific preferred embodiments of the invention, it should be apparent that the basic principals have a much broader application. The true scope of the invention is intended to be defined by the following claims and their obvious equivalents:

I claim:

1. In a two-stage catalytic exhaust gas conversion system wherein a substantially lead-free exhaust gas containing carbon monoxide and nitrogen oxide is first passed under $NO_x$-reducing conditions through a contacting zone containing a multivalent transitional metal oxide conversion catalyst, and then with added air through a second contacting zone containing a multivalent transitional metal oxide conversion catalyst to effect oxidation of carbon monoxide, the improved method for maintaining continuous conversion of nitrogen oxides which comprises periodically reversing the direction of flow and the sequence in which the exhaust gas contacts the respective catalysts in said conversion zones.

2. A method as defined in claim 1 wherein, in each contacting sequence, sufficient air is mixed with the exhaust gas between said contacting zones to provide a stoichiometric excess of $O_2/CO$ in the downstream contacting zone.

3. A method as defined in claim 1 wherein said periodic reversal in contacting sequence is actuated in response to each stopping or starting of the engine supplying said exhaust gas.

4. A method as defined in claim 1 wherein said contacting zones are maintained in heat exchange relationship to each other.

5. A method as defined in claim 1 wherein the catalysts in each of said contacting zones are selected from the class consisting of oxides of the metals of Groups IB, VB, VIB, VIIB and VIII of the Periodic Table.

6. A method as defined in claim 1 wherein the catalysts in each of said contacting zones comprise an oxide of copper.

* * * * *